INVENTORS
ERMAN V. CAVAGNERO
JOSEPH F. LOFTUS

BY

*McCormick, Paulding & Huber*

ATTORNEYS

United States Patent Office 3,559,263
Patented Feb. 2, 1971

3,559,263
METHOD FOR MAKING FORMED ARTICLES WITH SHAPED END PORTIONS FROM STRIP STOCK
Erman V. Cavagnero and Joseph F. Loftus, Torrington, Conn., assignors to The Torrington Manufacturing Company, Torrington, Conn.
Filed Apr. 24, 1968, Ser. No. 723,764
Int. Cl. B21h *1/12;* B21d *53/10;* B23p *17/00*
U.S. Cl. 29—148.4                                                21 Claims

ABSTRACT OF THE DISCLOSURE

Method for making formed articles with shaped end portions from strip stock comprising the steps of advancing a strip, partially severing and at least partially shaping end portions of adjacent workpieces, severing workpieces, forming workpieces to provide articles, and optionally welding together end portions. The partial severing and partial end portion shaping step may be carried out in a single step or in subsidiary steps involving respectively partial severing and end shaping. The forming step may comprise subsidiary partial and full forming steps with additional end shaping interposed therebetween. A wide variety of end shapes may be provided.

BACKGROUND OF THE INVENTION

This invention relates generally to the manufacture of formed articles from strip stock and, more particularly, to the manufacture of such articles wherein forming or shaping of end portions of the articles is required for subsequent welding or other operations. Conventional methods of manufacturing formed articles from strip stock are illustrated and described in U.S. Vogt Pat. No. 3,052,392; Vogt et al. U.S. Pat. No. 3,092,709; Maciorowski U.S. Pat. No. 3,315,512; and in co-pending U.S. applications Ser. No. 706,217, "Welding Method For Bearing Races and Other Articles," in the name of Erman V. Cavagnero; and Ser. No. 721,672 "Machine For Producing Bearings and The Like From Strip Stock" in the names of Erman V. Vavagnero and Joseph F. Loftus. In such conventional methods, strip stock is advanced intermittently along a predetermined path, as in a four-side forming machine of the type shown in the patents, and linear workpieces are severed successively from the leading end portion of the strip. Severed workpieces are formed about a mandrel or centerform and a welding operation may be carried out subsequently on end portions thereof as illustrated and described particularly in U.S. Pat. 3,092,709 and in co-pending application Ser. No. 721,672 "Machine for Producing Bearings and the Like From Strip Stock."

In the manufacture of formed articles in the manner set forth, forming or shaping of end portions of the articles may of course be necessary to meet a wide variety of requirements. It may, for example, be necessary to shape end portions of an article where the said end portions are unattached in order to meet subsequent manufacturing or use requirements. Where the end portions are attached as by welding, it is of course desirable or essential in the exercise of various welding methods to provide for end shaping as for upset control and other purposes.

End forming or shaping has been accomplished in the past to a limited extent with the provision of various devices including cut-off mechanisms with movable anvils as illustrated in U.S. Pat. 3,315,512 mentioned above. It will be apparent, however, that the degree or extent of end shaping is severely limited when the shaping function must be combined with a cut-off function in a single operation.

SUMMARY OF THE INVENTION

It is the general object of the general invention to provide a method for manufacturing formed articles from strip stock whereby end portions of the articles can be readily and conveniently shaped more precisely and more extensively than has heretofore been possible.

In fulfillment of this object, a new method step is introduced whereby end shaping in whole or part is accomplished prior to cutoff. Strip stock is advanced intermittently and is engaged and worked at predetermined intervals to define workpieces and to partially sever the same whereby to partially expose and at least partially shape similar oppositely oriented end portions of adjacent linear workpieces. The partial severing and shaping step is carried out in such manner that at least one integral connecting portion is retained to accommodate subsequent strip advancing movements for cutoff, forming operations, etc. The integral connection portion is, of course, substantially smaller in cross section than the cross section of the strip and yet is designed to provide sufficient strength for strip advancing movements even under exacting requirements encountered when the strip is advanced by a pushing action on a rear end portion thereof.

Subsequent to the partial severing and shaping step, a cut-off operation is carried out on the strip, possibly also involving a degree of end shaping, and linear workpieces are thus provided for forming into articles as required. When the method is practiced in the manufacture of welded articles, end portions of the articles are brought together in adjacent relationship during forming and are thereafter welded together as by electrical or other conventional welding methods.

The partial severing and end shaping step of the invention may be carried out in a unitary operation or, alternatively, the said step may comprise the sequential subsidiary steps of partially severing and end shaping. A wide variety of end shaping requirements can thus be satisfied in the practice of the method.

Still further, in accordance with the method of the invention, the forming step may be carried out in sequential subsidiary partial and full forming steps and a further end shaping step may be interposed between partial and full forming. Thus, with the combination of pre-cutoff end shaping, cut-off end shaping, and end shaping during forming, a high degree of shaping versatility is provided for.

The drawings show preferred embodiments of the method of the invention and such embodiments will be described, but it will be understood that various changes may be made from the embodiments disclosed, and that the drawings and description are not to be construed as defining or limiting the scope of the invention, the claims forming a part of this specification being relied upon for that purpose.

3

Figure 4:
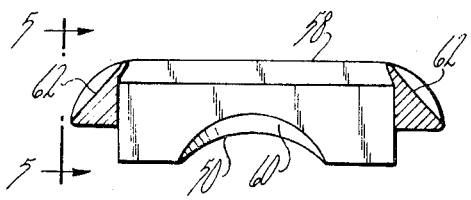
FIG. 4 is an enlarged transverse vertical section through the strip stock as indicated generally at 4—4 in FIG. 2.
Figure 5:
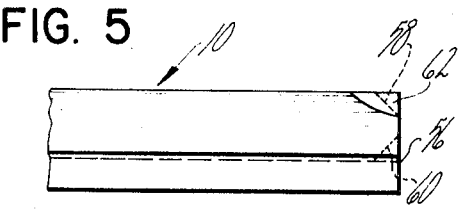

FIG. 5 is an enlarged fragmentary side elevation taken generally as indicated at 5—5 in FIG. 4.

Figure 1:
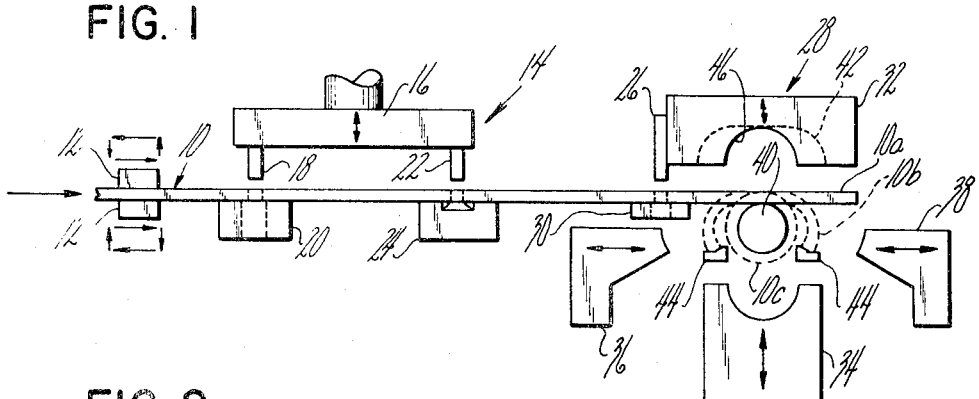
FIG. 1 is a schematic illustration in elevation showing strip stock manufactured into formed articles in accordance with the method of the invention, and including typical forming elements usable in the practice of a first embodiment of the method.
Figure 6:
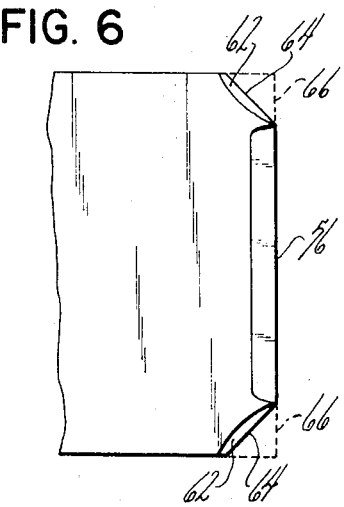

FIG. 6 is an enlarged fragmentary plan view of the stock taken generally as indicated at 6—6 in FIG. 1.

Figure 2:
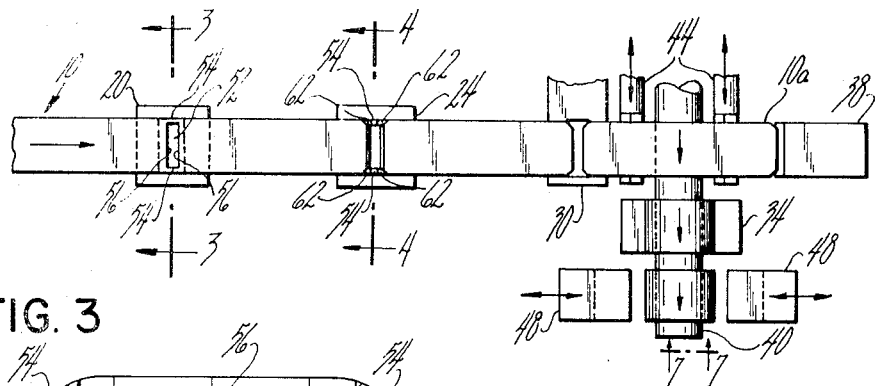
FIG. 2 is a schematic illustration in plan view similar to FIG. 1.
Figure 7:
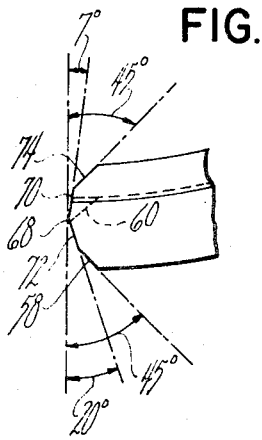

FIG. 7 is an enlarged fragmentary side elevation of the end portion of a workpiece taken after forming and end shaping has been completed and prior to welding as indicated generally at 7—7 in FIG. 2.

Figure 8:
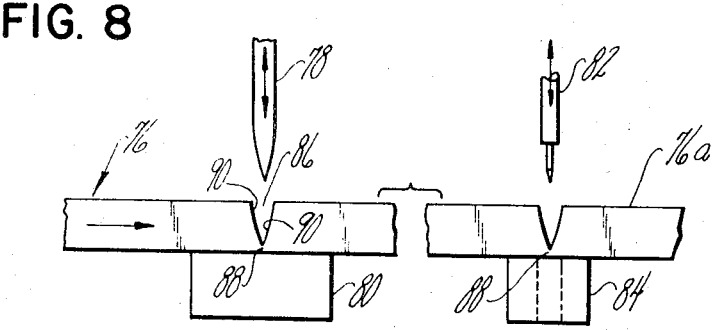

FIG. 8 is a schematic illustration in side elevation of strip stock and severing and forming elements in accordance with a second embodiment of the method of the invention.

Figure 9:
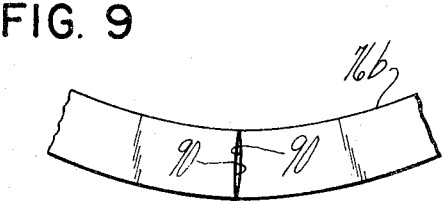

FIG. 9 is an enlarged fragmentary side elevation of end portions of a workpiece in welding position and which have been shaped in accordance with the FIG. 8 embodiment of the method.

Figure 10:
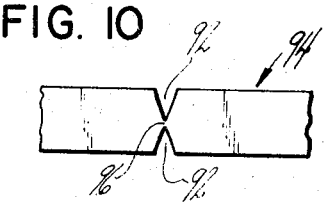

FIG. 10 is an enlarged fragmentary side elevation of a second form of end shaping attainable in the practice of the second embodiment of the invention.

Figure 11:
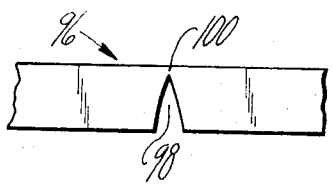

FIG. 11 is an enlarged fragmentary side elevation of a third form of end shaping attainable in the practice of the second embodiment of the invention.

DESCRIPTION OF THE PREFERRED EMBODIMENTS

In the embodiment of the method illustrated in FIGS. 1–7, welded bearing races are manufactured from strip stock, but it will be readily apparent that a wide variety of other formed and/or welded articles can be manufactured in the practice of the method. Strip stock indicated generally at 10 is advanced itnermittently from left to right in FIGS. 1 and 2 by means of an appropriate feed mechanism. Such feed mechanism is illustrated schematically in the form of gripper elements 12, 12 which engage the strip 10, advance forwardly from left to right transporting the strip therewith, move laterally outwardly, longitudinally rearwardly, and then laterally inwardly for engagement with the strip and a subsequent strip advancing movement. The partial severing and end shaping step of the method of the invention is carried out at a press station 14 by means of a press 16, upper and lower tools 18, 20 and upper and lower tools 22, 24. A cut-off tool 26 is reciprocable vertically adjacent a forming and welding station 28 and cooperates with an anvil 30 which is preferably of the transversely movable type shown in U.S. Pat. 3,315,512. At the forming and welding station 28, a severed linear workpiece such as 10a is operated upon during the forming step of the method by upper and lower forming tools 32 and 34, and by side forming tools 36 and 38, all of said tools cooperating with a center form or mandrel 40.

The forming step is carried out in FIGS. 1 and 2 in two stages comprising the sequential subsidiary steps of preforming or partial forming and full forming. Thus, at a rear position along the mandrel or centerform 40 a workpiece 10a severed from the leading edge portion of the strip 10 is partially formed to the configuration 10b, FIG. 1. Such partial forming is carried out by the upper forming tool 32, broken line surface 42, and by the side tools 36, 38. After partial forming, a further end forming or end shaping step is carried out by means of transversely reciprocable broaching tools 44, 44, the said tools engaging and being drawn rearwardly across the end portions or surfaces of the partially formed bearing race 10b.

Subsequent to the end shaping or forming step carried out by the broaching tools 44, 44, the partially formed bearing race 10b is transferred forwardly along the mandrel or centerform 40 to the intermediate position of FIG. 2. At such position forming is completed by means of the upper tool 32, full line surface 46, and the lower tool 34. Thus, the bearing race takes on the configuration 10c with its end portions in adjacent relationship for subsequent welding.

Welding is carried out at the forewardmost position

4 along the mandrel 40, FIG. 2, by means of electrodes and clamps 48, 48 movable inwardly and outwardly respectively for engagement and disengagement with the race.

Figure 3:
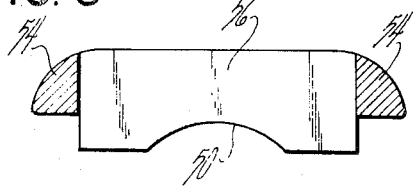
FIG. 3 is an enlarged transverse vertical section through the strip stock as indicated generally at 3—3 in FIG. 2.

The strip stock 10 employed in the manufacture of welded bearing races is preformed to an appropriate cross sectional configuration with a race groove 50 as best illustrated in FIG. 3. The width of the stock is substantially greater than its thickness and the stock is advanced in an inverted attitude with its groove facing downwardly as shown. The partial severing and end shaping step of the invention involves the provision of a small transverse slot 52 which extends throughout a major portion of the width of the strip, FIG. 2, and which defines narrow integral connecting portions 54, 54 at each end thereof. The slotting operation is carried out by suitable tools 18, 20 and partially exposes oppositely oriented end portions of adjacent linear workpieces in the form of transverse slot walls 56, 56. The narrow connecting portions 54, 54 are of sufficient strength to provide for effective feed movement of the strip 10 and yet result in the exposure of the major portion of each workpiece end portion as stated. The major portion of the end shaping step is carried out along the slot walls or end portions 56, 56.

Referring particularly to FIGS. 4 and 5, it will be seen that the transverse slot walls 56, 56, FIG. 1, are substantially vertical or substantially at right angles with the path of strip movement. There may, of course, be some departure from a right angular relationship but, in any event, the walls are exposed by slotting for the subsidiary end portion shaping step. Wide variation in end shaping is of course possible and the FIG. 4 and 5 shaping is directed to a specific set of requirements for welding upset control. In meeting the upset control requirements of the bearing race under consideration, at least one relief area is provided in the form of an area on a wall 56 which is inclined away from such wall and toward an external surface of the strip 10. In FIGS. 4 and 5 two such areas are provided and are indicated respectively at 58 and 60. The areas 58 and 60 are provided in a "coining operation" by appropriate tooling at 22, 24 and the area 58 takes the form of a flat surface which extends throughout the width of the slot 56 and thus covers a major portion of the overall width of the end portion of the workpiece subsequently formed. The area 60 is inclined from the wall 56 toward an external surface of the strip at the groove 50 and extends transversely along a substantial portion of the width of the groove. The angles of inclination of the areas 58, 60 may vary substantially in accordance with upset control or other requirements.

Further end shaping takes the form of small depressions 62, 62 formed approximately at each end of each connecting portion 54, 54 and at least approximately at junctions between side and top surfaces of the strip 10. The depressions 62, 62 survive cut-off and forming operations and also assist in upset control.

As mentioned above, a degree of end shaping may be accomplished during cut-off subsequent to the partial severing and end shaping step. In FIG. 6, the full line areas 64, 64 represent a cut-off operation wherein the connecting portions 54, 54 are severed to provide substantially flat surfaces which extend from the slot walls 56, 56 in planes inclined from the walls rearwardly or generally toward the transverse centerline of each workpiece. Alternatively, a straight cut-off operation may be provided for as indicated by the broken lines 66, 66. That is, the connecting portions 54, 54 may be severed in substantially vertical planes to provide the surfaces 66, 66.

A further or additional end shaping step is carried out after cutoff and may be accomplished between partial and full forming by the broaches 44, 44. In the present embodiment of the invention, such further or additional shaping step provides a completed end portion as illustrated in FIG. 7. Thus, generally V-shaped end portions are provided each with an apex 68 and opposite or upper and lower inclined surfaces 70, 72. The upper surface 70 extends in a plane inclined rearwardly at approximately 7° from the vertical or right angular relationship with the bearing surface. The lower surface 72 extends in a plane which is angled rearwardly at approximately 20° from the vertical. The aforementioned surface 58 extends in a plane angled rearwardly at approximately 45° and a surface 74 is also arranged at approximately 45° with the vertical. In the welding operation, the apexes 68, 68 of the V-shaped surfaces are arranged in facing relationship and welding is carried out with engagement occurring initially at the apexes and progressing outwardly therefrom. Excellent upset control conditions are achieved with the end shaping shown.

In a second embodiment of the method of the invention partial severing and end shaping is carried out in a single step as illustrated in FIG. 8. Thus, a strip 76 is advanced intermittently from left to right past press tools or the like 78, 80 and cut-off tools 82, 84. The tools 78, 80 engage the strip whereby to partially sever the same, to expose end portions of adjacent linear workpieces, and to shape the said end portions. As shown, a generally V-shaped notch 86 is provided in the upper surface of the strip 78 and extends transversely across the width thereof but terminates short of the opposite or lower surface of the strip to provide an integral connecting portion 88. End portion shaping provided for by the tool 78 may include the provision of substantially flat opposite transverse notch walls 90, 90 or, in the presently preferred form, the walls 90, 90 have a slight arcuate configuration or may be said to be concave viewed from the interior of the notch. Thus, the notch 86 may be characterized as somewhat U-shaped when viewed from the side. The included angle of the V-shaped notch 86 may vary widely but in the illustration of FIGS. 8 and 9, the angle is predetermined to provide for substantially flat endwise abutting engagement of the end portions of a workpiece after it has been formed to a circular configuration as illustrated in FIG. 9.

At the cut-off tool 82, it is necessary merely to sever the connecting portion 88 whereby to provide a linear workpiece 76a for subsequent forming and welding to a circular configuration. The slight arcuate configuration of the surfaces 90, 90 as shown in FIGS. 8 and 9 is particularly well suited to a particular electron beam welding operation employed in the joining of end portions of the completely formed workpiece or article 76b.

In FIG. 10 a partial end shaping step is illustrated wherein transverse generally V-shaped notches 92, 92 are provided on opposite sides of a strip 94 with apexes facing each other and with a narrow connecting portion 96 therebetween. Such end formation is desirable in certain types of welding as well as for other purposes and is readily provided in the practice of the method of the invention.

In FIG. 11 there is shown a strip 96 having a notch 98 provided in a lower surface thereof somewhat in the manner of the notch 86. A connecting portion 100 is provided by limiting the depth of the notch to a dimension somewhat less than the thickness of the strip. End shaping of the type shown in FIG. 11 may find use in welding upset control or in satisfaction of other requirements of manufacture or use.

We claim:

1. In a method for making formed articles with shaped end portions from linear workpieces cut from strip stocks, the steps of intermittently advancing longitudinally and along a predetermined path a strip of indeterminate length and having a lengthwise uniform cross section as required in the completed articles, engaging and working the strip at predetermined intervals to partially define and partially sever linear workpieces and to partially expose and at least partially shape similar but oppositely oriented end portions of adjacent workpieces while retaining at least one integral connecting portion substantially smaller in cross section than the cross section of the strip and yet of sufficient strength to accommodate subsequent strip advancing movements, severing said connecting portion at a trailing end of a forwardmost linear workpiece on the strip whereby to completely expose its rearward end portion and to free the workpiece, the aforesaid end portion shaping surviving said severing step, and engaging said workpiece and forming same to a required configuration, said last mentioned forming operation including bending the end portions of said workpiece generally toward each other.

2. A method as set forth in claim 1 wherein said forming step involves the bringing together in adjacent relationship of opposite end portions of said linear workpiece.

3. A method as set forth in claim 2 and including the further step of welding said adjacent end portions together.

4. A method as set forth in claim 3 wherein said welding step takes the form of electrical upset welding, and wherein said end portion shaping involves the provisions of relief areas adapted to receive upset material and to control final upset conditions.

5. A method as set forth in claim 3 wherein electron beam welding comprises said further step.

6. A method as set forth in claim 2 wherein said forming step comprises the subsidiary steps of partially forming said workpiece to a configuration wherein its end portions are substantially spaced and thereafter fully forming the workpiece, and wherein a further shaping step is carried out on free opposite end portions of the workpiece between said subsidiary partial and full forming steps.

7. A method as set forth in claim 1 wherein said strip has width thickness dimensions with the former substantially greater than the latter, and wherein said partial severing and end shaping step involves providing a small transverse slot through a major portion of the width of the strip with narrow integral connecting portions at each end thereof, said end shaping portion of said step being carried out on the strip substantially between said connecting portions.

8. A method as set forth in claim 7 wherein said partial severing and end shaping step comprises the subsidiary steps of first slotting the strip and thereafter shaping end portions which are partially defined by opposite transverse walls of the slot.

9. A method as set forth in claim 7 wherein said opposite slot walls are approximately at right angles with the path of strip movement, wherein said end shaping comprises the provision of at least one area on each such wall which is inclined away from the slot toward an external surface of the strip, wherein opposite end portions of the workpiece are brought together during said forming step, and wherein a further step comprises welding said end portions together with said inclined areas serving to control welding upset.

10. A method as set forth in claim 9 wherein said strip comprises bearing race material with a preformed longitudinal groove therein, and wherein said inclined area is provided along a substantial portion of the width of said groove.

11. A method as set forth in claim 9 wherein said strip comprises bearing race material with a preformed longitudinal groove therein, and wherein said inclined area is provided along a substantial portion of the width of the slot on a side of the strip opposite the groove.

12. A method as set forth in claim 11 wherein an inclined area is also provided along a substantial portion of the width of said groove.

13. A method as set forth in claim 12 wherein a small depression is provided at junctions between external surfaces of the strip at each end of each connecting portion, said depressions being located and sized to provide for upset control after severing and forming and during welding.

14. A method as set forth in claim 9 wherein said severing step is carried out at said connecting portions to provide substantially flat continuing surfaces extending in a common plane from said slot walls to the external surfaces of the strip.

15. A method as set forth in claim 9 wherein said severing step is carried out at said connecting portions to provide substantially flat surfaces extending from said slot walls in planes inclined from the walls toward the transverse centerline of each workpiece, said surfaces providing for control of welding upset.

16. A method as set forth in claim 9 wherein said forming step comprises the subsidiary of partially forming said workpiece to a configuration wherein its end portions are substantially spaced and thereafter fully forming the workpiece, and wherein a further shaping step is carried out on opposite end portions of a workpiece to provide for generally V-shaped surfaces at the end portions prior to welding, said V-shaped surfaces being arranged with apexes in adjacent relationship to engage initially during welding.

17. A method as set forth in claim 1 wherein said strip has width and thickness dimensions, and wherein said partial severing and end shaping step involves severing transversely throughout the width of the strip and through a major portion of the thickness thereof but retaining a small integral connecting portion comprising the remaining thickness of the strip.

18. A method as set forth in claim 17 wherein said partial severing and end shaping step involves providing in one surface of the strip a transverse generally V-shaped notch which extends across the width of the strip but with its apex terminating short of an opposite surface of the strip to provide said connecting portion.

19. A method as set forth in claim 18 wherein each wall of said V-shaped notch is provided with a shallow concave configuration to characterize the notch as somewhat U-shaped viewed from the side.

20. A method as set forth in claim 18 wherein the included angle of the V-shaped notch is such as to provide for substantially flat abutting engagement of opposite end portions of a workpiece when the workpiece is formed into a circular configuration.

21. A method as set forth in claim 17 wherein said partial severing and shaping step involves severing transversely throughout the width of the strip and through a major portion of the thickness thereof to provide transverse generally V-shaped notches with apexes facing each other and with a connecting portion therebetween.

References Cited
UNITED STATES PATENTS

| | | | |
|---|---|---|---|
| 1,787,255 | 12/1930 | Klocke | 29—149.5 |
| 1,892,555 | 12/1932 | Leis | 29—149.5 |
| 1,964,584 | 6/1934 | Klocke | 29—149.5X |
| 2,021,157 | 11/1935 | Stahl | 59—35X |
| 3,092,709 | 6/1963 | Vogt | 219—56 |

THOMAS H. EAGER, Primary Examiner

U.S. Cl. X.R.

29—149.5, 417